United States Patent [19]
Bossler, Jr.

[11] 3,969,713
[45] July 13, 1976

[54] BOLT STRESS DETECTOR
[75] Inventor: Robert Bossler, Jr., Bloomfield, Conn.
[73] Assignee: Kaman Aerospace Corporation, Bloomfield, Conn.
[22] Filed: Apr. 2, 1974
[21] Appl. No.: 457,346

[52] U.S. Cl. .............................. 340/265; 33/174 L; 73/88 F; 73/105; 85/62
[51] Int. Cl.² ........................................... G01B 7/28
[58] Field of Search ........................ 73/88 F, 105; 116/DIG. 34, 114 R; 85/62; 340/265; 33/174 L

[56] References Cited
UNITED STATES PATENTS

| | | | |
|---|---|---|---|
| 1,766,991 | 6/1930 | Gardner | 33/174 L |
| 2,136,675 | 11/1938 | Danse | 340/265 X |
| 3,481,041 | 12/1969 | Oakes | 73/105 X |
| 3,561,260 | 2/1971 | Reynolds | 73/88 F |

Primary Examiner—David L. Trafton
Attorney, Agent, or Firm—Cushman, Darby and Cushman

[57] ABSTRACT

A method and apparatus for testing stress on a bolt head or nut having a central portion which deflects along the bolt axis as a function of stress, in which three electrical contacts, for example screws, are mounted in a line on and extending outwardly from a housing member, the two outer contacts being positioned to electrically connect to peripheral portions of a bolt head or nut when the center contact electrically connects to the deflected central portion and the head or nut has the desired pre-load. The outer contacts are connected to one polarity terminal of a battery via respective indicator bulbs while the center contact connects directly to the other polarity terminal so that both bulbs are lit when the contacts are so applied and the peripheral and central portions are in a given relation, preferably a single plane.

4 Claims, 4 Drawing Figures

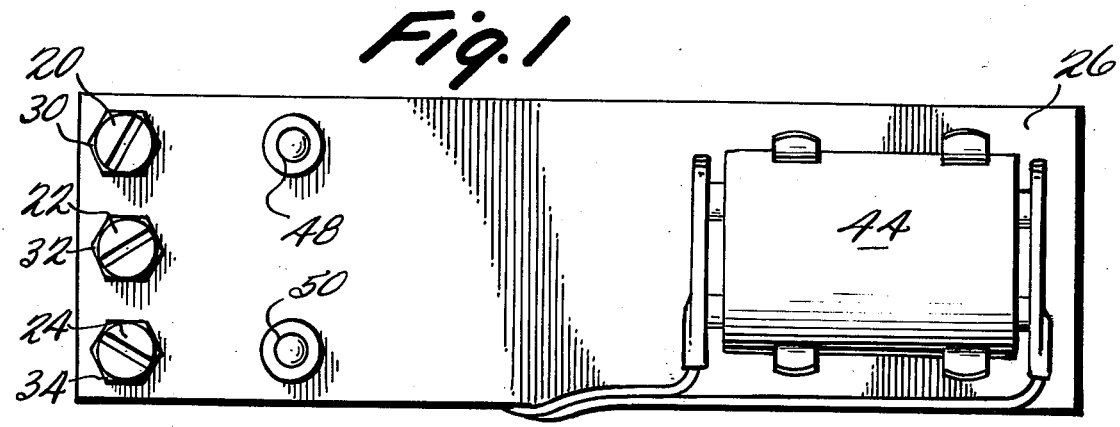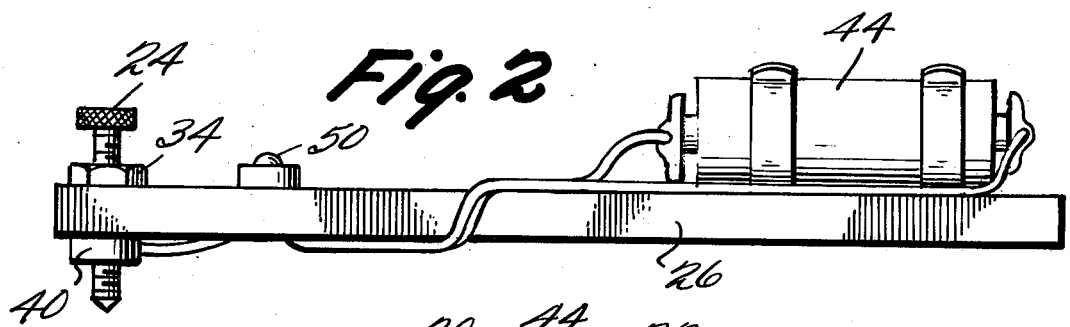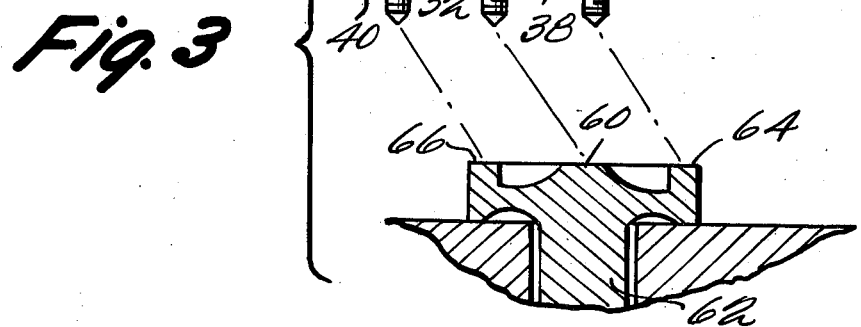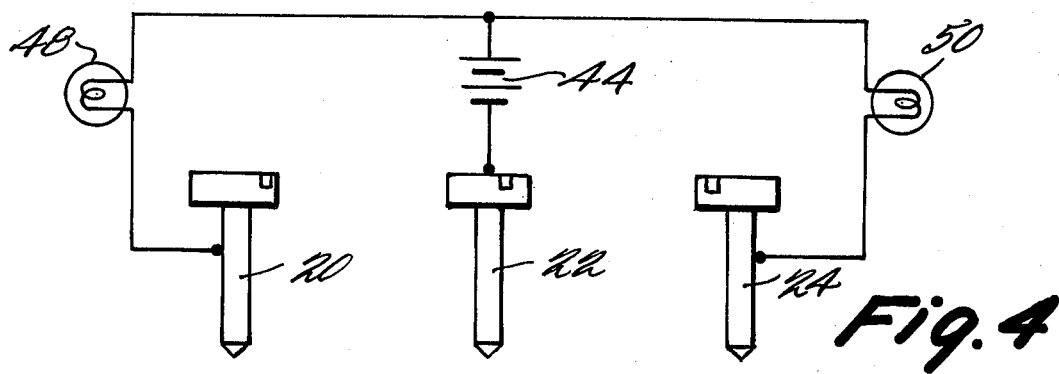

BOLT STRESS DETECTOR

BRIEF DESCRIPTION OF THE PRIOR ART AND SUMMARY OF THE INVENTION

The invention relates to a method and apparatus for testing stress on a bolt head or nut of the type having a central portion which deflects along the bolt axis with respect to peripheral portions thereof as a function of stress.

Most bolts are normally installed with an initial tension, usually called preload. The purpose of this bolt preload is to reduce cyclic loading from external loads to a level at which the bolt can survive indefinitely. It is desirable to apply as high a preload stress as possible in order to make sure that the preload is maintained as long as the bolt remains in use. Obviously, it is desirable to choose the upper limit larger than the external load or the life of the bolt will be limited.

There are a number of techniques now in use for measuring bolt preload. The simplest way is to measure the torque applied during installation by a torque wrench or the like. However, variations in friction and wrench accuracy result in a large variation in preload applied by this technique. A 25% variation in preload with a torque wrench has been observed. With this variation, the highest possible preload range is roughly 60–100% of yield strength. Therefore, a repeated external load of 70% yield strength can cause failure of a bolt whose preload is determined by a torque wrench. If the preload range is increased from 80–100% of yield strength, the same bolt will have an indefinite life with the same repeated external load of 70% yield strength.

Other methods of measuring preload now in use have higher accuracy than wrench torque but are still not completely satisfactory. One method now used involves a preload indicating washer comprising a trapped metal ring which is crushed in a clearly indicated manner at a known load during installation. This approach, however, does not show if the desired preload has been exceeded and may not show reliably if the preload has been lost after a considerable period of time in use. In addition, the assembly is not reusable since the trapped metal ring is essentially destroyed.

Another bolt now used has a small hole along its axis for most of the length of the bolt through which an indicating pin fits which is anchored near the thread end so as to protrude past the head end of the bolt. As the bolt stretches under load during installation, the pin retracts until it is flush with the bolt head at the desired preload. This method shows if preload has been reached or exceeded and if the preload has been maintained. However, the axial hole weakens the bolt and the system does not work well for short bolts where the bolt stretch under load is extremely small.

Another method of determining preload now in use is by measuring the bolt stretch under load with a micrometer. Again a short bolt has an extremely small stretch and this small stretch requires measurement accuracy beyond the capability of a conventional hand-held micrometer. Further, many installations are not accessible to micrometer measurement.

Another technique which is occasionally employed is to install heated bolts. With this technique, however, accurate preload control is difficult and loss of preload is not indicated.

U.S. patent application No. 372,667, filed June 22, 1973, now U.S. Pat. No. 3,886,840, and U.S. Pat. application 299,799, filed Oct. 24, 1972, now U.S. Pat. No. 3,812,758, both describe an improved technique for determining measurement of preload which is highly accurate and which indicates if preload has been exceeded or lost. No expensive tools or procedures are required and the measurement is largely independent of bolt length, assembly friction and assembly torque measurement. As described in the above-mentioned applications, the bolt head is machined to form a thin circular ring which functions as a spring and which deflects along the axis of the bolt shaft as the load is increased or decreased. An indicator pin can be mounted on the central deflecting portion so that the deflection can be ascertained with respect to a nondeflecting indicator washer mounted about the periphery of the head with the pin extending through a central passage in the washer. Other arrangements in the above-mentioned applications show different combinations in which the difference in position between a deflecting and nondeflecting member can be ascertained.

The present invention relates to a further method and apparatus for detecting stress on a bolt head or nut of the type described in the above-mentioned applications having a central portion which deflects as a funtion of stress. However, according to this technique, there is no need for providing either an indicator pin or a separate indicating washer. Thus, the expense of providing this structure is eliminated. Further, either the bolt head or the nut can be machined to provide a deflecting central portion. A simple apparatus is utilized for determining when the central deflection portion and the nondeflecting peripheral portions are in a given relation indicating a desired stress, for example, in a single plane.

This apparatus is comprised of three electrical contacts, for example, three screws, extending outwardly from a housing member and having pointed ends for electrically contacting the bolt head or nut whose preload is to be checked. The electrical contacts lie in a plane and, preferably, in a straight line, the three contacts being separated so that when the center contact electrically connects to the deflecting central portion, the two outside contacts electrically connect to opposed peripheral portions. The central contact, according to the embodiment described in detail below, is connected to one polarity terminal of a portable DC battery, while the two outer contacts are connected to the other polarity terminal via respective indicator bulbs. Thus, when the bolt has the desired preload and, for example, the central portion and the two peripheral portions all lie in a single plane, application of the contacts to the respective portions of the bolt head or nut as indicated above will cause both lamps to be illuminated providing a simple and positive indication that the stress is correct. The central contact may be bifurcated for use in measuring deflection of a nut, so that the bifurcated central contact can straddle the portion of the bolt that protrudes through the nut.

The apparatus can be readily used in situations where the bolt is not readily accessible for testing by any of the other techniques described above. If only one of the bulbs is illuminated, then the central portion has been deflected upward to an extent indicating that the desired preload has not been maintained. If neither of the bulbs light, indicating that the central contact does not touch the central portion of the bolt head or nut, then the preload is greater than desired.

BRIEF DESCRIPTION OF THE DRAWINGS

FIG. 1 shows a top view of the unique testing apparatus of this invention.

FIG. 2 shows a side view of that apparatus.

FIG. 3 shows an end view of that apparatus showing in cross-section a bolt of the type having a central portion which deflects along the bolt axis as a function of stress.

FIG. 4 shows an electrical schematic illustrating the connection to the three electrical contacts.

DETAILED DESCRIPTION OF THE DRAWINGS

Reference is now made to FIGS. 1–3, which illustrate one embodiment of the unique apparatus of this invention. As indicated briefly above, three electrical contact members 20, 22 and 24 are mounted on a housing member 26 which may comprise any suitable nonconductive material, for example, plastic or the like. In the embodiment illustrated in FIGS. 1–3, electrical contacts 20, 22 and 24 are simply screws which extend through holes drilled in housing member 26 with nuts 30, 32, 34, 36, 38 and 40, holding screws 20, 22 and 24 in place and permitting adjustment of those screws so that they extend outward from one side of member 26 for any desired length. The screws preferably come to a point at one end as indicated providing an electrical connection point. These pointed ends of screws 20, 22 and 24 preferably but not necessarily lie in a straight line.

A conventional dry cell storage battery 44 is also mounted on housing member 26 and is electrically connected to two conventional indicator bulbs 48 and 50, as well as to screws 20, 22 and 24. Referring to FIG. 4, which illustrates the schematic electrical connection of battery 44 to screws 20, 22 and 24, it can be seen that one polarity terminal of battery 44 is directly connected to the central screw 22 while the other polarity terminal is connected respectively to screws 20 and 24 via bulbs 48 and 50. Thus, when screws 20 and 22 are electrically connected together, for example, by being electrically connected to a metal bolt nut or screw, a current path is completed through bulb 48 which illuminates that bulb. Similarly, when screws 22 and 24 are electrically connected together by a metal path, bulb 50 is illuminated by the resulting current flow.

As can be seen in FIG. 3, screws 20, 22 and 24 are separated by a suitable distance so that the pointed end of screw 22 is aligned with the central portion 60 of a bolt head or nut 62, which has portions around the central area cut away as illustrated, so that the central portion 60 deflects along the axis of the bolt as a function of the applied stress and with respect to the peripheral portions thereof, for example, peripheral portions 64 and 66. The pointed end of screws 20 and 24, respectively, are aligned with peripheral portions 64 and 66. If central portion 60 and peripheral portions 64 and 66 lie in a single plane or otherwise lie in the same relation as the pointed ends of screws 20, 22 and 24, and the pointed ends are applied to the respective portions, then both bulbs 48 and 50 will be illuminated. Normally this indicates that the desired preload stress is being maintained.

If the stress is not maintained, then central portion 60 will deflect above or below the adjacent peripheral portions. When the apparatus is applied, it will now not be possible for all of the pointed ends of screws 20, 22 and 24 to, at the same time, be in electrical connection with the respective areas. Accordingly, it will only be possible for one of the bulbs 48 or 50 to be illuminated at one time indicating that the desired preload has not been maintained. Similarly, if the preload should be greater than desired, the pointed end of screw 22 will not be able to contact the deflecting central portion 60 which will deflect downward and neither of bulbs 48 nor 50 will be illuminated.

While the measuring device is particularly useful in measuring stress in a bolt head or nut, it also finds utility whenever the planar relationship of three electrically conductive points must be accurately found.

Many changes and modifications in the abovedescribed embodiment of the invention can, of course, be carried out without departing from the scope thereof. Accordingly, that scope is intended to be limited only by the scope of the appended claims.

What is claimed is:

1. Apparatus for detecting the relative location of two electrically conductive bodies comprising:
    a housing member,
    first, second and third electrical contacts mounted on said housing member to extend outward therefrom and separated so that said first and third contacts are in electrical connection with said first body when said second contact is in electrical connection with said second body, each said contact comprising a screw movable inward and outward,
    first and second indicator means for providing an indication when an electrical signal is applied, and
    means for connecting said first, second and third contacts to a source of electrical energy so that said first indicator means provides said indication when said first contact is electrically connected to said second contact and said second indicator means provides said indication when said third contact is electrically connected to said second contact.

2. Apparatus as in claim 1 wherein said indicator means comprise electrical lamps and further including a source of electrical energy mounted on said housing member.

3. Apparatus as in claim 2 wherein said source is a DC battery and wherein said connecting means connects one polarity of said battery directly to said second contact and connects the other polarity of said battery to said first and third contacts via said first and second indicator means respectively.

4. Apparatus as in claim 1 wherein said first, second and third electrical contacts form a roughly straight line to extend outward from said housing member and separated from each other so that said first and third contacts are aligned with peripheral portions of a bolt member when said second contact is aligned with a central portion of a bolt member.

* * * * *